US007059702B2

(12) United States Patent
Haney et al.

(10) Patent No.: US 7,059,702 B2
(45) Date of Patent: Jun. 13, 2006

(54) SYSTEMS AND METHODS FOR DETERMINING PRINTHEAD IN A STANDBY POSITION

(75) Inventors: Marcia D. Haney, Oregon City, OR (US); David W. Hanks, Forest Grove, OR (US); Michael W. Whalen, Tigard, OR (US); Mark H. Cowan, Sherwood, OR (US)

(73) Assignee: Xerox Corporation, Stamford, CT (US)

( * ) Notice: Subject to any disclaimer, the term of this patent is extended or adjusted under 35 U.S.C. 154(b) by 236 days.

(21) Appl. No.: 10/875,587

(22) Filed: Jun. 25, 2004

(65) Prior Publication Data

US 2005/0285888 A1 Dec. 29, 2005

(51) Int. Cl.
*B41J 29/393* (2006.01)
*B41J 25/308* (2006.01)
*G01D 15/10* (2006.01)

(52) U.S. Cl. ............................ 347/19; 347/8; 347/198

(58) Field of Classification Search .................. 347/19
See application file for complete search history.

(56) References Cited

U.S. PATENT DOCUMENTS 5,806,996 A * 9/1998 Leys et al. .................. 347/198
5,820,275 A * 10/1998 Crawford et al. ........... 400/185
6,015,205 A * 1/2000 Chambers et al. ............ 347/8

* cited by examiner

*Primary Examiner*—Lamson Nguyen
*Assistant Examiner*—Jannelle M. Lebron
(74) *Attorney, Agent, or Firm*—Oliff & Berridge, PLC

(57) ABSTRACT

A system and method for determining proper positioning of the printhead as it travels between first and second positions by sampling an electrical resistance signal of a motor during tilting of the printhead, calculating an average of specified samples at a time, and comparing the calculated average to a predetermined threshold to determine whether the printhead is operating properly. Thus, the need for sensors to determine the positioning of the printhead is eliminated.

20 Claims, 4 Drawing Sheets

SYSTEMS AND METHODS FOR DETERMINING PRINTHEAD IN A STANDBY POSITION

BACKGROUND OF THE INVENTION

1. Field of Invention

This invention generally relates to systems and methods for determining a printhead in a standby position.

2. Description of Related Art

A typical imaging apparatus, such as an ink-jet printer or a thermal printer, forms an image onto a recording medium, such as paper or film, by causing ink or the like to be deposited onto the recording medium. For example, an ink-jet printer performs printing by discharging ink through a printhead having nozzle(s) with an orifice and an electro-thermal transducer which generates discharge energy for discharging ink from the orifice to form a pattern of ink dots on the recording medium. The printhead discharges the ink along a track by moving back and forth. Many printheads must also move toward and away from a printer's surface. However, the movement of the printhead may get trapped, jammed or wedged along the way. For example, in certain solid ink printing, the printhead is moved between printing, wiping and standby positions. If the printhead is not properly positioned, ink may be misdirected.

Thus, in the past, a separate sensor was required to determine the position of the printhead so that the ink could be properly ejected onto the recording medium.

For example, conventional printers use an optical sensor to ensure proper positioning of the printhead. However, separate sensors require numerous cablings and connectors to operate. Further, many printers typically have more than one sensor to determine positioning of the printhead, especially apparatus with color inks. Thus, the use of sensors becomes expensive, which drives the cost of manufacturing up. Moreover, because of the need for cables and connectors to operate the sensors, printing apparatus become large and bulky.

SUMMARY OF THE INVENTION

Considering the above conventional drawbacks, it is desired to provide a printing apparatus control method which can efficiently determine the position of the printhead without the need of separate, standalone sensors.

An exemplary embodiment according to the systems and methods of the invention includes the use of sampling of electrical signals showing the resistance force on the motor while the printhead assembly is rotated by a head tilt cam to determine if the printhead has properly moved to a standby position.

According to the invention, an average sampling of electrical signals will be compared with a designated threshold. The signals are a measurement of resistance during a specified time, while tilting from the print position to the standby position. If the average is above the threshold, it is determined that the print head has properly tilted to the standby position.

In various exemplary embodiments of the systems and methods according to the invention, the electrical signals correspond to the measure of resistance force on the motor.

In various exemplary embodiments of the systems and methods according to the invention, the printhead is determined to operate properly when the calculated average value is above the predetermined threshold.

In various exemplary embodiments of the systems and methods according to the invention, the printhead is determined to not be operating properly when the calculated average value is below the predetermined threshold.

In further various exemplary embodiments of the systems and methods according to the invention, the predetermined threshold is a resistance value of 2.6

In various exemplary embodiments of the systems and methods according to the invention, the calculated average value is measured a specified number of readings, such as 5.

In various exemplary embodiments of the systems and methods according to the invention, the sampling of motor signals will be every 5 milliseconds after a specified start time.

In various exemplary embodiments of the systems and methods according to the invention, the electrical motor signals are sampled over a predetermined time interval.

In further various exemplary embodiments of the systems and methods according to the invention, the interval is 0.4 seconds.

In various exemplary embodiments of the systems and methods according to the invention, a tilting arm provides movement to the printhead in different positions.

In yet further various exemplary embodiments of the systems and methods according to the invention, the different positions include a standby position, a wipe position and a home/print position These and other features and advantages of the invention are described in, or are apparent from, the following detailed description of various exemplary embodiments of the systems and methods according to this invention.

BRIEF DESCRIPTION OF THE DRAWINGS

Various exemplary embodiments of the systems and methods of this invention will be described in detail, with reference to the following figures, wherein.

DETAILED DESCRIPTION OF EXEMPLARY EMBODIMENTS

Figure 1:
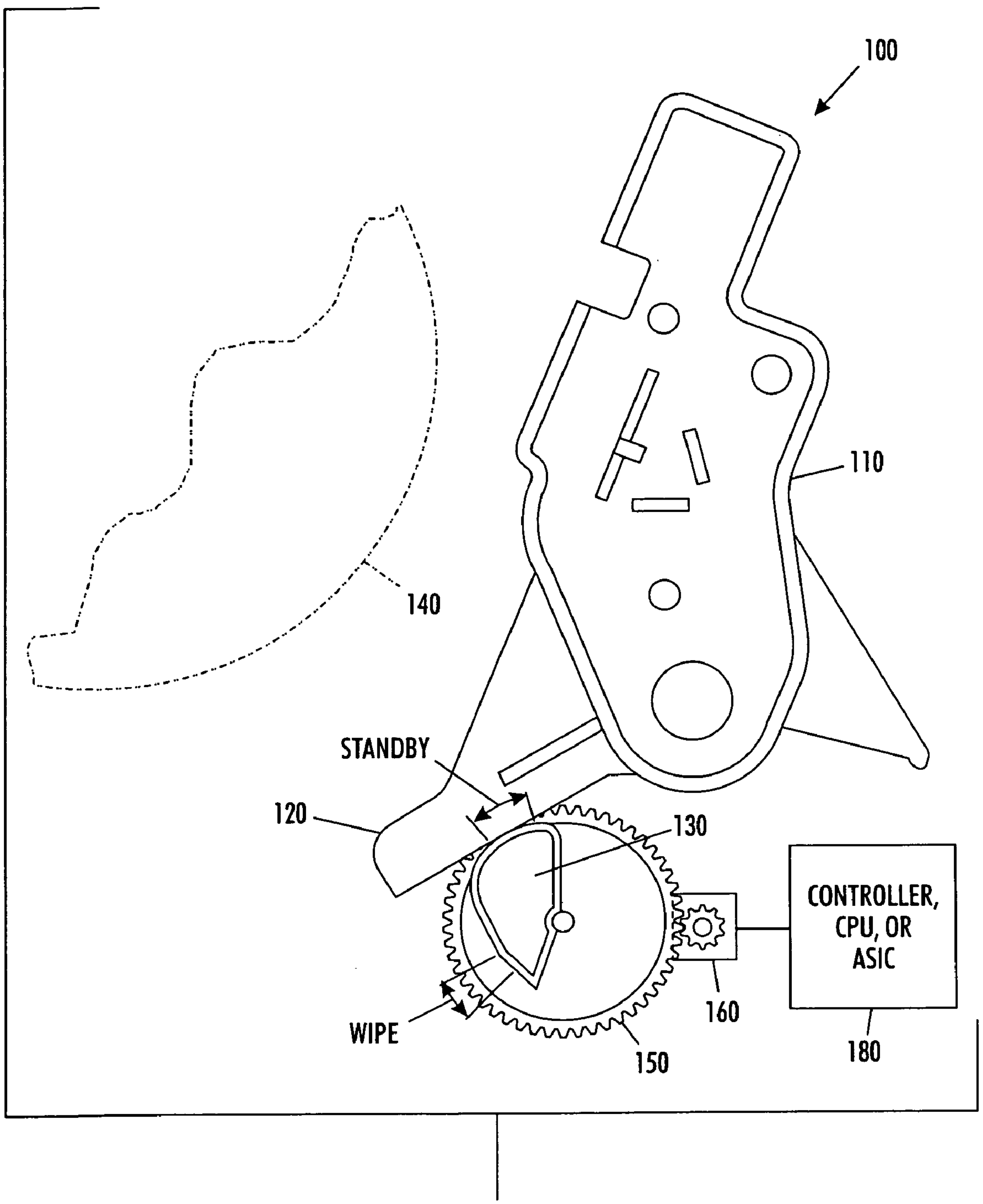
FIG. 1 illustrates an exemplary embodiment of a printing apparatus that determines the position of a printhead rotated by a cam according to this invention.

FIG. 1 illustrates an exemplary embodiment of an apparatus that determines the printhead position as it is rotated by a cam according to this invention. As shown in FIG. 1, the printing apparatus 100 includes a printhead 110, a tilting arm 120, a cam 130, a rolling drum 140, a gear train 150, a motor 160, and a processing means 180, such as a controller, custom ASCI or CPU.

As an exemplary embodiment, the printing apparatus 100 is a solid-ink printer, for example, a Xerox 8400 printer. However, the invention to this and is applicable to any type of printing apparatus having a reciprocating or movable printhead.

In solid-ink printing, the printhead 110 ejects an ink onto the rolling drum 140 that transfers the ink onto a recording medium, for example, but not limited to, paper, labels, transparencies, envelopes and business cards. The printhead 110 has an array of nozzles that can jet out a predetermined quantity of ink into the surface of drum 140 as known in the art.

The cam 130 rotates and engages the tilt arm 120, thereby rotating the printhead 110 into various positions, either closely adjacent to drum 140 or away from drum 140. This is achieved by the engaged cam 130 being driven by motor 160.

In an exemplary embodiment, the different positions include a standby, a wipe and a home/print position. In moving to the standby position, the cam 130 rotates the tilt arm 120 to move the printhead 110 in a position that is tilted away and farthest from the rolling drum 140. In the wipe position, the printhead 110 is at a position where it can be engaged with a wiping device, such as, for example, a wiper blade. In the print/home position, the printhead 110 is close to the rolling drum 140 so that the ink can be applied on the drum 140.

The cam 130 includes gear train 150 to drive the cam 130 via motor 160 having mating gear teeth. An exemplary motor is a servo motor. The printhead tilt motor provides data to the controller that is related to the movement of the motor. If the torque is high or low, the feedback gives the controller the information to make corrections, for example to keep a constant velocity, by increasing motor output force to compensate for the resistance force. The time in the tilt process at which the sampling is averaged should give a value over the designated threshold if the print head is tilting properly. This same feedback could be used in other cam designs, to show resistance and profile. Upon activation of drive motor 160, the cam 130 rotates, which causes the tilting arm 120 to tilt the printhead 110 from the print position to the standby position. During the rotation, spring force resistance acting on the motor 160 is higher. Controller 180 then analyzes the electrical signals to determine whether the printhead 110 is at a desired location.

Figure 2:
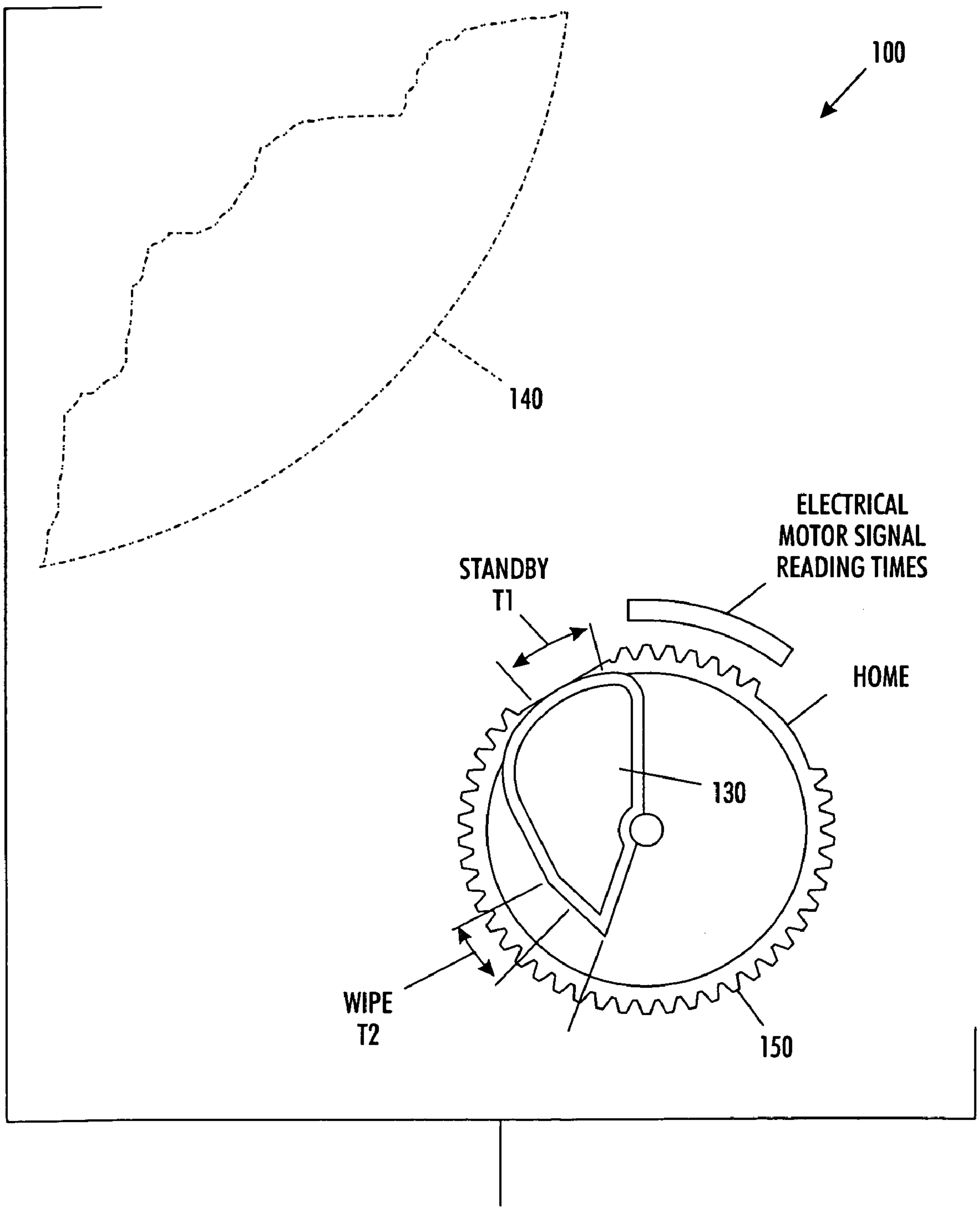
FIG. 2 illustrates in greater detail the components of the cam of FIG. 1.

FIG. 2 illustrates in greater detail the components of the cam 3. As shown in FIG. 2, the cam 130 includes two dwells T1, T2. As an exemplary embodiment, T1 is when the cam 130 is in standby position (i.e., the printhead 110 is tilted away from the drum 140), and T2 is when the cam 130 is in the wipe position (i.e., in a position to receive a wiper on the printhead 110 during a head cleaning operation).

It should be appreciated that as the printhead tilts to the standby position T1, from the home/print position, more spring resistance is applied to the motor 160 as the cam 130 rotates the tilt arm 120.

The cam 130 includes gear teeth and a flat area (e.g., missing gear teeth). The flat area is used to lock the printhead 110 in the print position. In this position, the printhead 110 is not able to tilt. As an exemplary embodiment, the printhead 110 is restrained against the cam 130 by a spring. It should be appreciated that other restraints may be used, for example, but not limited to, a pin, screw, etc.

It should be appreciated that the printhead 110 must be in the standby position prior to moving the wiper in front of the printhead so that the wiper will not run into the bottom of the printhead 110 and cause damage. Accordingly, there is a need to ensure that the printhead 110 has been properly moved to the standby position.

Various testing was conducted to monitor the electrical motor signals during this printhead movement. It was determined that when the printhead 110 was rotated by the cam 130 properly, the motor operated above a certain threshold. When moved improperly, the motor signals were lower. From this, it was determined that a threshold could be used to determine whether proper movement was achieved, without the need for a separate standalone sensor that directly measured actual position.

While the printhead 110 moves from the print position to the standby position, a timer is started. At a predetermined time, samples of the electrical motor signals are sequentially taken. As an exemplary embodiment, five readings are averaged out to determine the average electrical motor signal. If the average is over a predetermined threshold, for example, but not limited to, a resistance value of 2.6 generated by the motor 160, then the printhead 110 is determined to be properly tilted to the standby position. If the average is below the predetermined resistance threshold of 2.6 generated by the motor 160, then five more readings are averaged to determine if the printhead 110 has been properly tilted to the standby position. It should be appreciated that extra iterations of readings can be implemented. For example, it has been determined that the printhead 110 usually succeeds after the fourth set of readings. However, if the average motor signal read never goes above the threshold within the specified time, then the controller 180 will declare a fault, which indicates an error in the positioning of the printhead.

In an exemplary embodiment, the readings are taken every 5 milliseconds for 0.4 seconds. However, it should be appreciated that the invention will work at various intervals by comparing the average samples with a predefined threshold.

It should be appreciated that other resistance thresholds besides 2.6 may be compared, depending on the particular motor, spring force on the cam, and movement of the printhead for a particular application.

Figure 3:
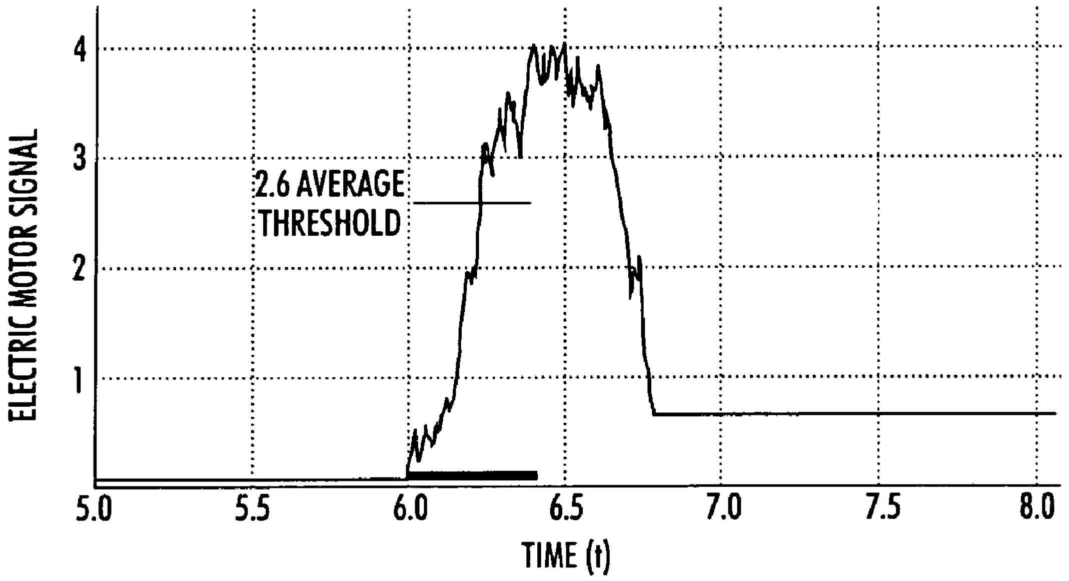
FIG. 3 is a chart of sampled electrical motor signals when the printhead is in proper working condition.

FIG. 3 is a chart of sampled motor signals when the printhead 110 is in proper working condition. The chart shows the current resistance readings of the motor 160 during the sampling while moving from print/home to standby position.

As an exemplary embodiment, while tilting the printhead 110 from the print position to the standby position, the operation waits 0.1 seconds and then begins reading the motor signals from the motor 160. The operation averages five readings, one reading taken every 5 milliseconds over a 0.4 second interval. An averaged reading is then calculated from these readings. If it is determined that the averaged reading is above the resistance threshold of 2.6, then the printhead 110 is determined to be properly tilted to the standby position.

As shown in FIG. 3, the electric motor signals during the 0.4 second sampling interval is above the 2.6 resistance threshold, which indicates the proper engagement of the cam and that the printhead rotated to the standby position.

Figure 4:
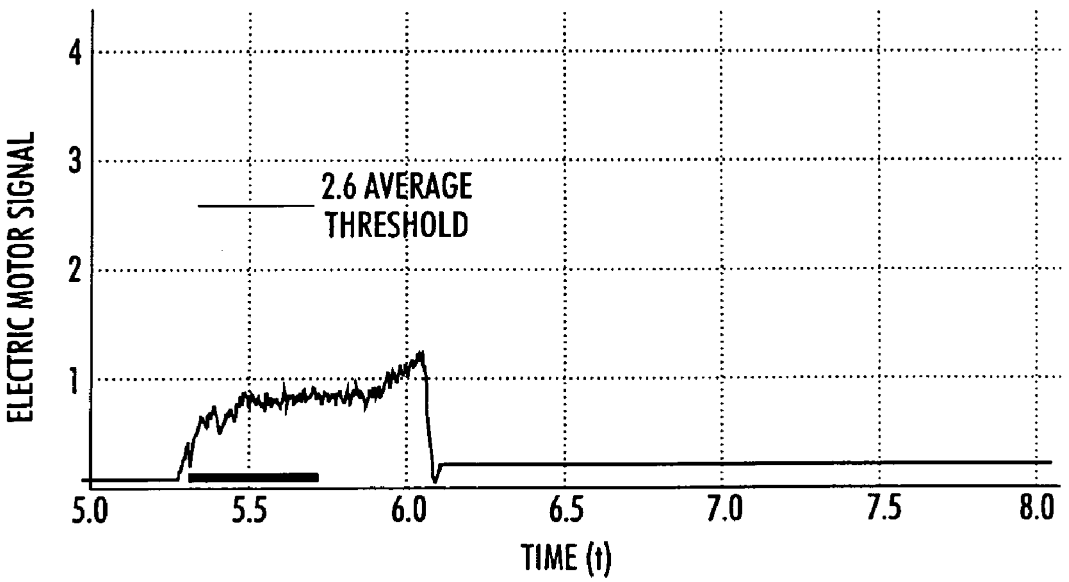
FIG. 4 is a chart of sampled electrical motor signals when the printhead is not in proper working condition.

FIG. 4 is a chart of sampled electrical motor signals when the cam did not properly engage, the printhead 110 didn't rotate to the standby position, and is thus not in proper working condition. The chart shows the current resistance readings of the motor 160 during the sampling of the motor signals from home/print position to the standby position.

As an exemplary embodiment, the initial operation of FIG. 4 is similarly operated as in FIG. 3 for measuring motor signals during the tilting motion from home/print position to standby position for the motor 160. The operation also preferably takes five readings of the motor resistance signals over a 0.4 second interval and obtains an averaged reading.

As shown in FIG. 4, the motor signals during the 0.4 second interval are below the 2.6 resistance threshold, which indicates that the printhead 110 did not properly tilt to the standby position when engaging the cam 130. Because the average is below the current threshold of 2.6 resistance, five more readings may be performed and averaged. It should be appreciated that additional sets of readings can be performed. For example, it has been found that the printhead 110 usually succeeds after the fourth averaged reading. However, if the averaged motor signals during the specified duration of time tilting from print/home position to the standby position never goes above the threshold of 2.6 resistance, the controller 180 will declare a fault. This can prevent the wiper from hitting the bottom of the printhead 110 when the printhead 110 is improperly positioned.

Figure 5:
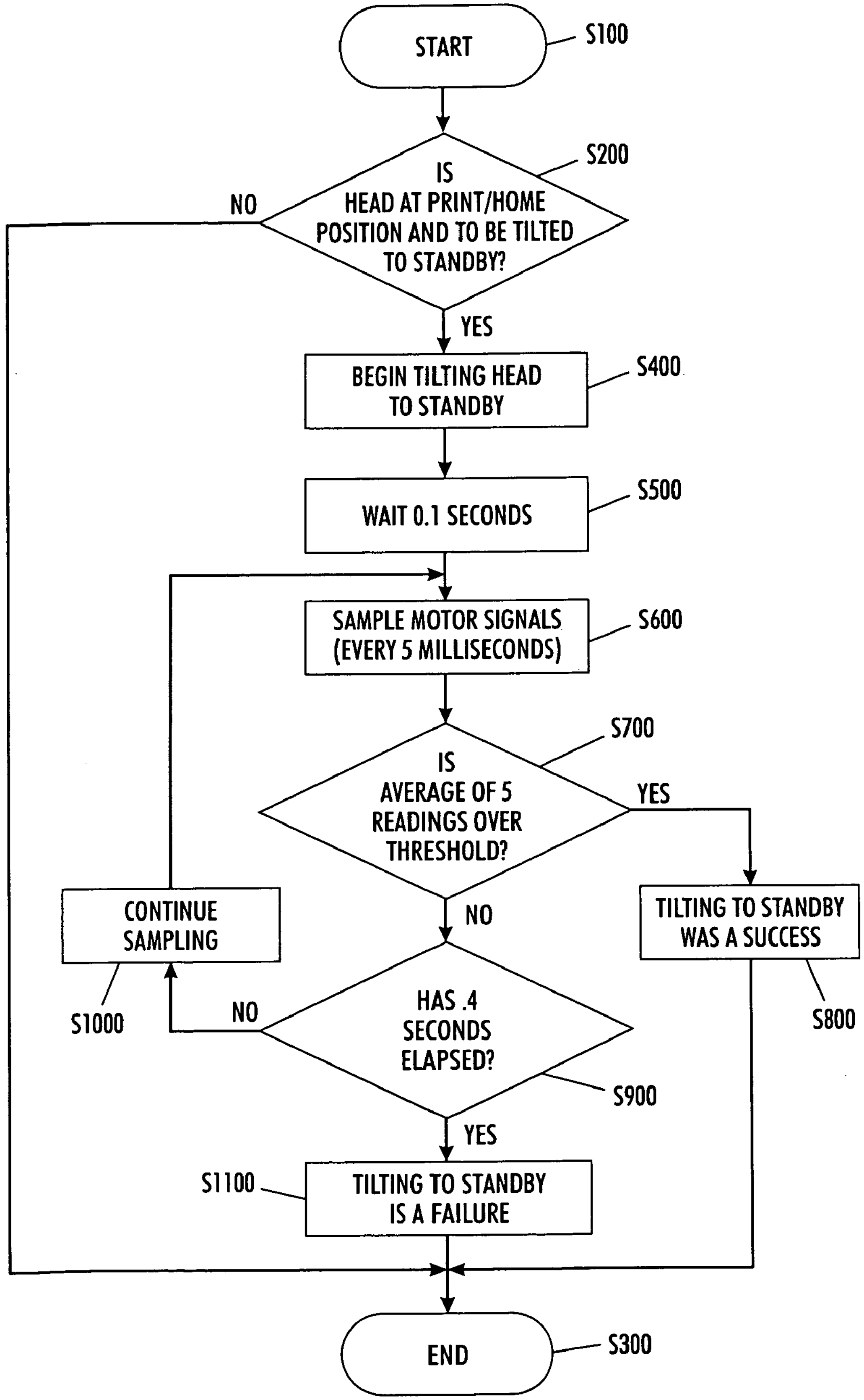
FIG. 5 is a flowchart outlining one exemplary embodiment of a method for determining the position of the printhead according to this invention.

FIG. 5 is a flowchart outlining an exemplary embodiment of a method for determining the position of the printhead to this invention. As shown in FIG. 5, beginning in step S100, the operation starts. The operation of the method continues to step S200, where it is determined whether the tilt position of the printhead is in the print position and there is a request for the printhead to be tilted to the standby position.

If it is determined at step S200 that the printhead is not being tilted from the print position, operation continues to step S300 which terminates the checking of the position of the printhead. On the other hand, if it is determined at step S200 that the printhead is at the print position and tilting is requested, operation proceeds to step S400.

In step S400, the printhead starts to move from the print position to the standby position. Operation then proceeds to step S500.

At step S500, as the printhead is tilting to the standby position, the operation waits a predetermined time interval, such as 0.1 second, and starts a timer to read the motor 160 electronic signals over a set time interval. As an exemplary embodiment, the set time interval is 0.4 sec (400 millisecond). Operation then proceeds to step S600.

In step S600, the operation samples the motor signals every 5 milliseconds and calculates an average. While tilting from home to standby the cam rotates the tilt arm and the motor signals should show higher resistance.

At step S700, an average of 5 motor signals are read and compared against the designated threshold (2.6). If the average is over 2.6, then the operation proceeds to step S800 and the tilting to standby was a success. Otherwise, the operation at step S900 compares the time to see if the 0.4 time limit has elapsed. If it has not, it continues sampling at step S1000 every 5 msecs (S600). It then goes back to S700 to compare another average of 5 motor signals.

If at step S900, 0.4 seconds of time has elapsed, then the rotation to standby was a failure and something went wrong. At step S1100, if the time elapses and the sampling of motor signals never averages above the signal resistance threshold of 2.6, the controller 180 declares a fault, indicating that the printhead was not properly rotated to the standby position.

While the invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made to the invention without departing from the spirit and scope thereof.

What is claimed is:

1. A method for determining whether a printhead has reached a desired position without a standalone sensor, comprising:

sampling electrical signals from a motor while tilting from the first position to the second position;

calculating an average electrical signal which measures a mechanical resistance value over a specified period of time;

comparing the calculated average electrical signal resistance value to a predetermined threshold to determine whether the printhead properly rotated to the desired second position.

2. The method according to claim 1, wherein the printhead is determined to have properly reached the desired second position when the average value is above the predetermined threshold.

3. The method according to claim 1, wherein the printhead is determined to have not properly reached the desired second position when the average value is below the predetermined threshold.

4. The method according to claim 1, wherein the electrical signals correspond to a measure of motor torque resistance.

5. The method according to claim 1, wherein the second position is a standby position.

6. The method according to claim 1, wherein the calculated average value is measured using a specified number of sample readings.

7. The method according to claim 6, wherein the specified number is 5.

8. The method according to claim 1, wherein the samplings are about every 5 milliseconds.

9. The method according to claim 1, wherein the electrical signals are sampled over a predetermined time interval.

10. The method according to claim 9, wherein the interval is about 0.4 seconds.

11. A printing apparatus for determining whether a printhead has reached a desired printing position among several possible printhead positions without a standalone sensor, comprising:

a printhead;

a tilting arm connected to the printhead for moving the printhead into different positions;

a cam engaged with the tilting arm;

a drive motor connected to the cam for rotation of the cam, the drive motor generating variable electrical signals;

means for sampling the electrical signals over time as the printhead moves between first and second printhead positions;

calculating means for calculating an average value of the specified number of sampled electrical signals; and determining means for determining whether the printhead is in the second position based on a comparison of the average value with a predetermined threshold.

12. The printing apparatus according to claim 11, wherein the positions include at least a standby position and a print position.

13. The printing apparatus according to claim 12, wherein the sampling occurs during movement between the first position and the standby position.

14. The printing apparatus according to claim 11, wherein the printhead is determined to have properly reached the second position when the calculated average value is above the predetermined threshold.

15. The printing apparatus according to claim 11, wherein the printhead is determined to have not properly reached the second position when the calculated average value is below the predetermined threshold.

16. The printing apparatus according to claim 11, wherein the electrical signals correspond to a measure of motor torque resistance.

17. The printing apparatus according to claim 11, wherein the calculated average value is measured using a specified number of sample readings.

18. The printing apparatus according to claim 11, wherein the electrical signals are sampled over a predetermined time interval.

19. The printing apparatus according to claim 18, wherein the time interval is 0.4 seconds.

20. The printing apparatus according to claim 11, wherein the samplings are at about 5 millisecond intervals.

* * * * *